United States Patent
Lin et al.

(10) Patent No.: US 8,330,925 B2
(45) Date of Patent: Dec. 11, 2012

(54) PROTECTION LAYER FOR A PERIPHERAL CIRCUIT HAVING A PHOTO SPACER MATERIAL AND AT LEAST ONE OF A COLOR FILTER MATERIAL AND A BLACK MATRIX MATERIAL DIRECTLY STACKED ON EACH OTHER

(75) Inventors: Yi-Tsun Lin, Taipei (TW); Chun-Jen Chiu, Taichung (TW); Yen-Heng Huang, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 264 days.

(21) Appl. No.: 12/371,923

(22) Filed: Feb. 17, 2009

(65) Prior Publication Data
US 2010/0149465 A1    Jun. 17, 2010

(30) Foreign Application Priority Data
Dec. 12, 2008    (TW) ................ 97148644 A (51) Int. Cl.
G02F 1/1335 (2006.01)
G02F 1/1333 (2006.01)
G02F 1/1339 (2006.01)
G02F 1/1345 (2006.01)

(52) U.S. Cl. ........ 349/149; 349/106; 349/110; 349/155; 349/151; 349/152

(58) Field of Classification Search ............... 349/106, 349/110, 138–139, 149, 152
See application file for complete search history.

(56) References Cited

U.S. PATENT DOCUMENTS

| | | | |
|---|---|---|---|
| 5,930,607 A * | 7/1999 | Satou | 438/158 |
| 7,161,640 B2 | 1/2007 | Yang et al. | |
| 2005/0117093 A1 * | 6/2005 | Kim et al. | 349/106 |
| 2005/0140892 A1 | 6/2005 | Kim et al. | |
| 2006/0023135 A1 * | 2/2006 | Park | 349/40 |
| 2006/0028598 A1 | 2/2006 | Lee et al. | |
| 2007/0064186 A1 * | 3/2007 | Son et al. | 349/127 |
| 2007/0109467 A1 * | 5/2007 | Chang et al. | 349/106 |
| 2007/0229752 A1 * | 10/2007 | Chen | 349/152 |
| 2007/0287080 A1 | 12/2007 | Glazer et al. | |

FOREIGN PATENT DOCUMENTS

| | | |
|---|---|---|
| CN | 1368718 | 9/2002 |
| JP | 2005-274668 | 10/2005 |

OTHER PUBLICATIONS

"1st Office Action of China counterpart application", issued on Sep. 18, 2009, p. 1-p. 6.

* cited by examiner

Primary Examiner — Lauren Nguyen
(74) Attorney, Agent, or Firm — Jianq Chyun IP Office (57) ABSTRACT

A display panel includes a first substrate, a pixel array, a peripheral circuit, a first protection layer, a second protection layer, a display medium, and a second substrate. The first substrate array has a display area and a peripheral area, wherein the pixel array is disposed in the display area, the peripheral circuit is disposed in the peripheral area, and the pixel array and the peripheral circuit are electrically connected. The first protection layer is disposed on the display area and the peripheral area to cover the pixel array and the peripheral circuit. The second protection layer is at least disposed on the first protection layer within the peripheral area. Here, the second protection layer includes a color filter material layer, a black matrix material layer, a photo spacer material layer, or a combination thereof. The second substrate is disposed above the first substrate to expose the peripheral area.

11 Claims, 6 Drawing Sheets

PROTECTION LAYER FOR A PERIPHERAL CIRCUIT HAVING A PHOTO SPACER MATERIAL AND AT LEAST ONE OF A COLOR FILTER MATERIAL AND A BLACK MATRIX MATERIAL DIRECTLY STACKED ON EACH OTHER

CROSS-REFERENCE TO RELATED APPLICATION

This application claims the priority benefit of Taiwan application serial no. 97148644, filed on Dec. 12, 2008. The entirety of the above-mentioned patent application is hereby incorporated by reference herein and made a part of specification.

BACKGROUND OF THE INVENTION

1. Field of the Invention

The present invention generally relates to a display panel, and more particularly, to a display panel capable of enhancing protection of a peripheral circuit thereon.

2. Description of Related Art

With advantages of high definition, small volume, light weight, low driving voltage, low power consumption, and a wide range of applications, a liquid crystal display (LCD) has replaced a cathode ray tube (CRT) display and has become the mainstream display product in the next generation. A conventional LCD panel is formed by a color filter substrate having a color filter layer, a thin film transistor (TFT) array substrate, and a liquid crystal layer sandwiched between the color filter substrate and the TFT array substrate.

In general, an active array substrate has an active area and a peripheral circuit area. A plurality of pixels are disposed in the active area to form a pixel array, and a peripheral circuit is formed in the peripheral circuit area. Each of the pixels includes a TFT and a pixel electrode connected thereto. Additionally, each of the pixels is surrounded by two adjacent scan lines and two adjacent data lines. These scan lines and data lines are often extended from the active area to the peripheral circuit area and connected to the aforesaid peripheral circuit, and the peripheral circuit is further connected to an external driver integrated circuit (IC).

Figure 1A:
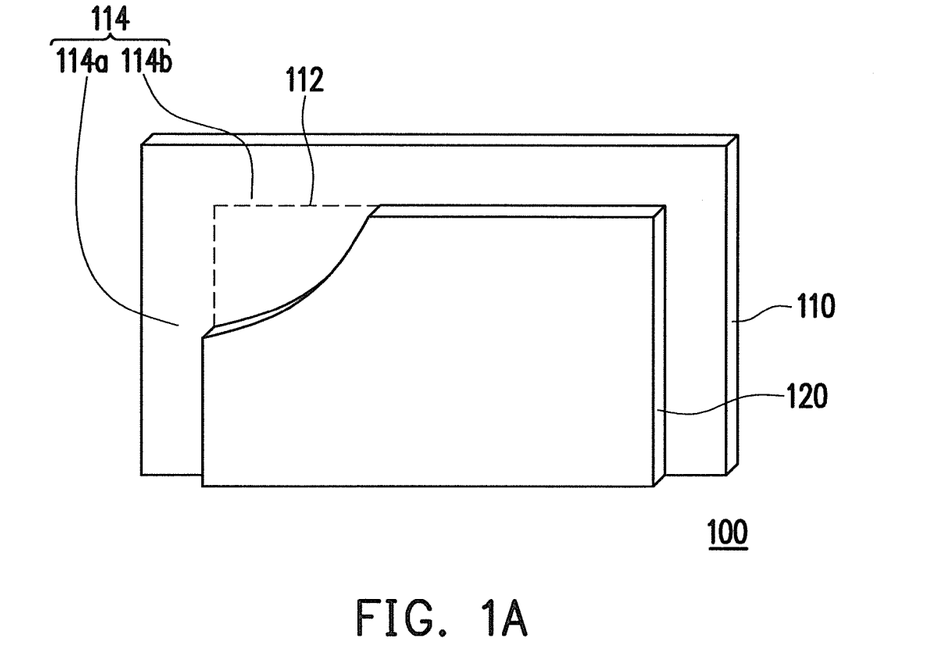
FIG. 1A is a schematic view of a conventional display panel.
Figure 1B:
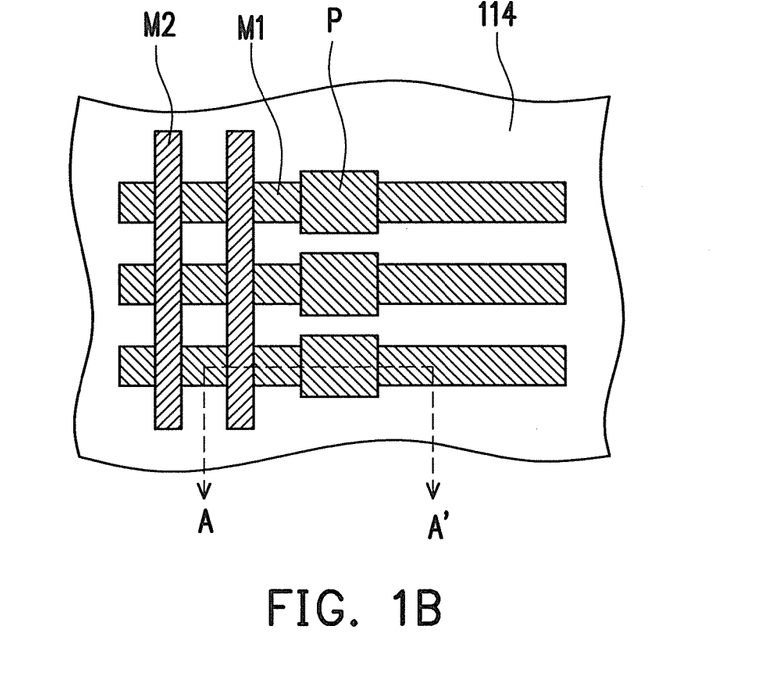
FIG. 1B is a schematic partial top view of OLB areas in a peripheral circuit depicted in FIG. 1A.
Figure 1C:
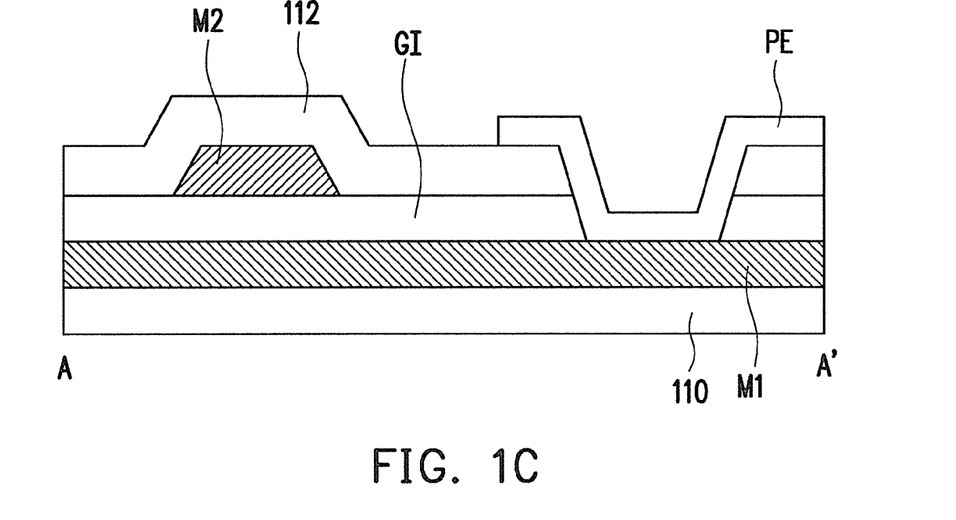
FIG. 1C is a schematic cross-sectional view taken along a line A-A' depicted in FIG. 1B.

FIG. 1A is a schematic view of a conventional display panel. FIG. 1B is a schematic partial top view of outer lead bonding (OLB) areas in a peripheral circuit depicted in FIG. 1A. FIG. 1C is a schematic cross-sectional view taken along a line A-A' depicted in FIG. 1B. Referring to FIG. 1A, the conventional display panel 100 includes a first substrate 110, a second substrate 120, a display area 112, and a peripheral area 114. The second substrate 120 is disposed on the display area 112 of the first substrate 110. The peripheral area 114 includes a gate OLB area 114a and a source OLB area 114b.

Next, referring to FIGS. 1B and 1C, a plurality of metal wirings M1 and a plurality of metal wirings M2 are disposed in the gate OLB area 114a of the peripheral area 114, and an insulating layer GI is disposed between the metal wirings M1 and M2. Through pads P of the metal wirings M1, a pixel electrode PE can be electrically connected to a driving circuit (not shown).

Nevertheless, in the conventional display panel 100, the second substrate 120 does not cover the peripheral area 114. In other words, intersections of the metal wirings M1 and the metal wirings M2 on the first substrate 110 are exclusively covered by a protection layer 112. Here, the protection layer 112 is usually constituted by silicon nitride or silicon oxide having a thickness in a micrometer scale, and therefore the protection layer 112 is very much likely to be scratched during fabrication and testing. Specifically, since the metal wirings M1 and the metal wirings M2 transmit different signals, when the intersections of the metal wirings M1 and the metal wirings M2 are scratched, abnormal image signals are generated in the display panel 100. Thereby, yield rate of the display panel 100 is reduced.

SUMMARY OF THE INVENTION

The present invention is directed to a display panel for enhancing protection of a peripheral circuit in the display panel and yield rate of the display panel.

In the present invention, a display panel including a first substrate, a pixel array, a peripheral circuit, a first protection layer, a second protection layer, a display medium, and a second substrate is provided. The first substrate includes a display area and a peripheral area. The pixel array is disposed in the display area, the peripheral circuit is disposed in the peripheral area, and the pixel array and the peripheral circuit are electrically connected. The first protection layer is disposed on the display area and the peripheral area to cover the pixel array and the peripheral circuit. The second protection layer is at least disposed on the first protection layer within the peripheral area. Here, the second protection layer includes a color filter material layer, a black matrix material layer, a photo spacer material layer, or a combination thereof. The second substrate is disposed above the display area to expose the peripheral area. The display medium is disposed between the first substrate and the second substrate.

According to an embodiment of the present invention, the peripheral circuit of the display panel has a plurality of pads, and the first protection layer has a plurality of first openings exposing the pads. The second protection layer entirely covers the first protection layer which is not covered by the second substrate, and the second protection layer has a plurality of second openings located above the first openings to expose the pads.

According to an embodiment of the present invention, in the display panel, the second protection layer covers a portion of the first protection layer which is not covered by the second substrate, and the second protection layer does not cover the first openings. The peripheral circuit has a plurality of OLB areas and a plurality of wire on array (WOA) areas. The second protection layer covers the OLB areas and the WOA areas, and the second protection layer is formed by stacking at least two of the color filter material layer, the black matrix material layer, and the photo spacer material layer.

According to an embodiment of the present invention, in the display panel, the second protection layer exclusively covers the OLB areas.

According to an embodiment of the present invention, in the display panel, the second protection layer exclusively covers the WOA areas.

According to an embodiment of the present invention, in the display panel, the display medium includes liquid crystal, an organic electro-luminescent material, or an electrowetting display medium.

According to an embodiment of the present invention, in the display panel, the peripheral circuit has a multi-layer circuit structure, and the second protection layer covers intersections of traces in different layers of the multi-layer circuit structure.

According to an embodiment of the present invention, the display panel further includes a black matrix layer and a plurality of color filter layers. The black matrix layer is disposed on the pixel array and has a plurality of openings, and the color filter layers are disposed on the pixel array and located in the openings.

According to an embodiment of the present invention, the display panel further includes a color filter layer disposed on the pixel array.

According to an embodiment of the present invention, in the display panel, the second substrate has a black matrix layer, and the black matrix layer has a plurality of openings respectively located above one of the color filter layers.

According to an embodiment of the present invention, the display panel further includes a black matrix layer disposed on the pixel array. The black matrix layer has a plurality of openings, and the second substrate has a plurality of color filter layers. Each of the color filter layers is respectively located above one of the openings.

In light of the foregoing, the display panel of the present invention can enhance protection of the peripheral circuit in the display panel and yield rate of the display panel by disposing the second protection layer.

In order to make the aforementioned and other features and advantages of the present invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

First Embodiment

Figure 2A:
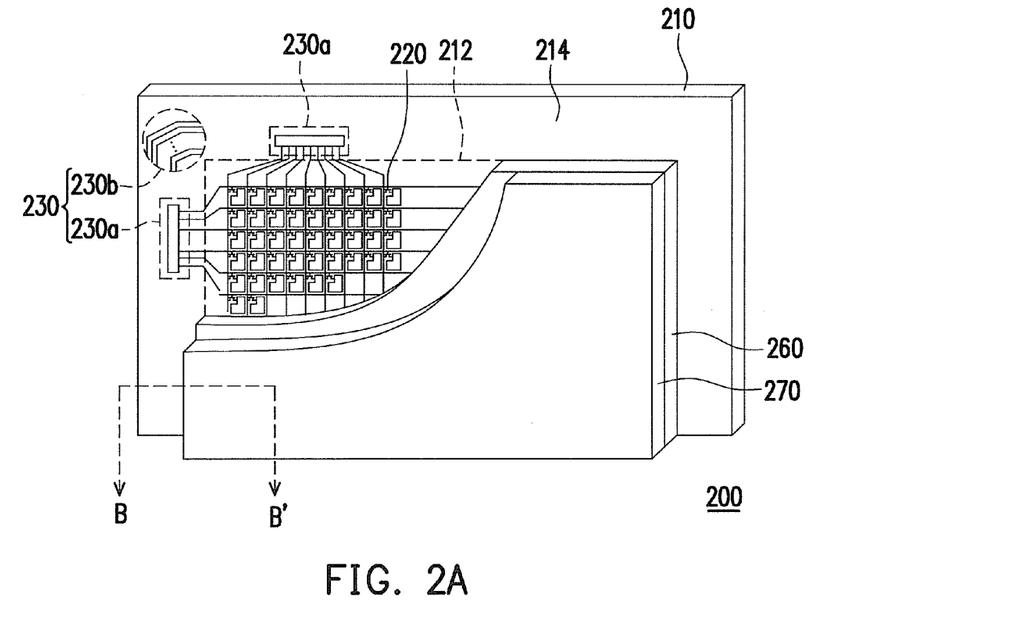
FIG. 2A is a schematic view of a display panel according to the present invention.
Figure 2B:
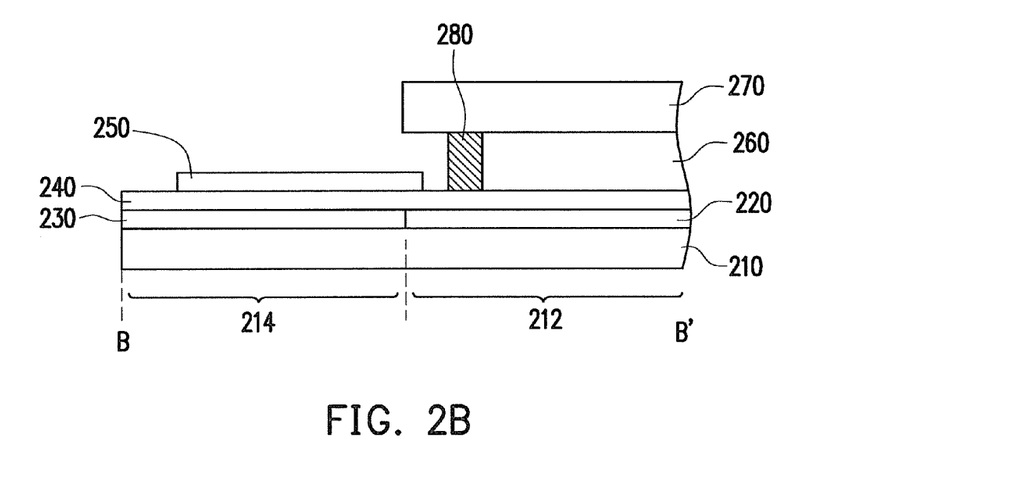
FIG. 2B is a schematic cross-sectional view taken along a line B-B' depicted in FIG. 2A.

FIG. 2A is a schematic view of a display panel according to the present invention. FIG. 2B is a schematic cross-sectional view taken along a line B-B' depicted in FIG. 2A. Referring to FIGS. 2A and 2B, the display panel 200 of the present embodiment includes a first substrate 210, a pixel array 220, a peripheral circuit 230, a first protection layer 240, a second protection layer 250, a display medium 260, and a second substrate 270. The first substrate 210, the pixel array 220, the peripheral circuit 230, the first protection layer 240, and the second protection layer 250 together form an array substrate of the present embodiment. The first substrate 210 has a display area 212 (surrounded by dotted lines) and a peripheral area 214 (an area outside the dotted area). The pixel array 220 is disposed in the display area 212, the peripheral circuit 230 is disposed in the peripheral area 214, and the pixel array 220 and the peripheral circuit 230 are electrically connected. The first protection layer 240 is disposed on the display area 212 and the peripheral area 214 to cover the pixel array 220 and the peripheral circuit 230. The second protection layer 250 is at least disposed on the first protection layer 240 within the peripheral area 214. Here, the second protection layer 250 includes a color filter material layer, a black matrix material layer, a photo spacer material layer, or a combination thereof. The second substrate 270 is substantially disposed above the display area 212 of the first substrate 210 to expose the peripheral area 214. Besides, the display medium 260 is disposed between the first substrate 210 and the second substrate 270, and a sealant 280 disposed between the first substrate 210 and the second substrate 270 surrounds the display medium 260.

According to the present embodiment of the present invention, the display medium 260 can be liquid crystal, an organic electro-luminescent material, or an electrowetting display medium. That is to say, the display panel 200 can be an LCD panel, an organic electro-luminescent display panel, or an electrowetting display panel. The sealant 280 can be any appropriate bonding substance.

Figure 3:
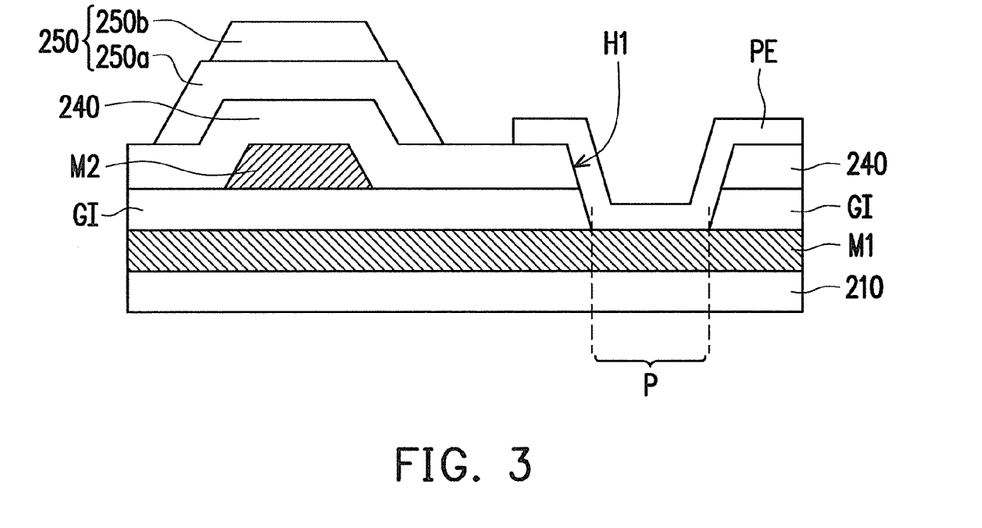
FIG. 3 is a schematic cross-sectional view of a peripheral circuit according to a first embodiment of the present invention.

FIG. 3 is a schematic cross-sectional view of a peripheral circuit according to the first embodiment of the present invention. Next, referring to FIGS. 2A and 3, the peripheral circuit 230 has a multi-layer circuit structure. Besides, the peripheral circuit 230 includes metal wirings M1, metal wirings M2, and an insulating layer GI located between the metal wirings M1 and the metal wirings M2. In the present embodiment, the peripheral circuit 230 has a plurality of OLB areas 230a and a plurality of WOA areas 230b, and the OLB areas 230a and the WOA areas 230b are covered by the second protection layer 250. Specifically, intersections of traces in different layers of the peripheral circuit 230 are covered by the second protection layer 250 as depicted in FIG. 3 where the second protection layer 250 is disposed above the intersections of the metal wirings M1 and the metal wirings M2. Note that areas covered by the second protection layer 250 can be modified based on arrangement of the peripheral circuit 230 and actual demands. For instance, according to other embodiments of the present invention, the second protection layer 250 can exclusively cover the OLB areas 230a or the WOA areas 230b.

The second protection layer 250 is, for example, formed by stacking at least two of the color filter material layer, the black matrix material layer, and the photo spacer material layer, which is exemplified as films 250a and 250b in FIG. 3. By contrast, in another embodiment of the present invention, the second protection layer 250 can also be any one of said three material layers or a combination thereof.

As indicated in FIG. 3, the peripheral circuit 230 has a plurality of pads P exposed by a plurality of first openings H1 of the first protection layer 240. It should be mentioned that the second protection layer 250 at least covers a portion of the first protection layer 240 which is not covered by the second substrate 270, so as to protect the peripheral circuit 230. In addition, it is not necessary for the second protection layer 250 to cover the first openings H1, such that the pads P can be electrically connected to a driving circuit through a pixel electrode PE.

Practically, patterns of the second protection layer 250 can be adjusted based on actual demands. For instance, in a process of integrating the color filter layer into a color filter on array, thin films constituting the second protection layer 250 can be simultaneously formed on the peripheral area 214 of the first substrate 210 while a color filter layer or a black matrix layer is formed.

Figure 4:
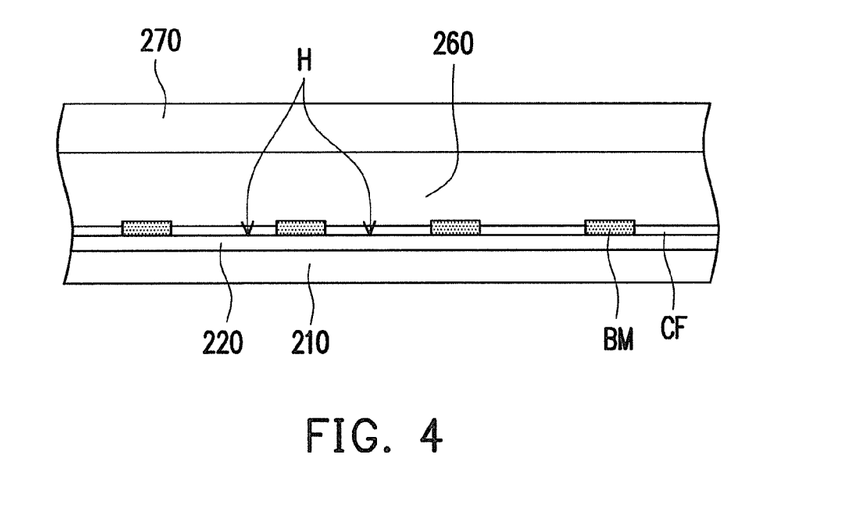
FIG. 4 is a schematic cross-sectional view of a display area according to the first embodiment of the present invention.

FIG. 4 is a schematic cross-sectional view of a display area according to the first embodiment of the present invention. Referring to FIG. 4, in the present embodiment, the display panel 200 may further include a black matrix layer BM and a plurality of color filter layers CF. The black matrix layer BM is disposed on the pixel array 220 and has a plurality of openings H. The color filter layers CF are disposed on the pixel array 220 and located in the openings H. Certainly, the formation of the black matrix layer BM is not necessary for designing certain display panels. Namely, in the present embodiment, it is likely to merely dispose the color filter layers CF on the pixel array 220 without forming the black matrix layer BM on the pixel array 220.

Figure 5:
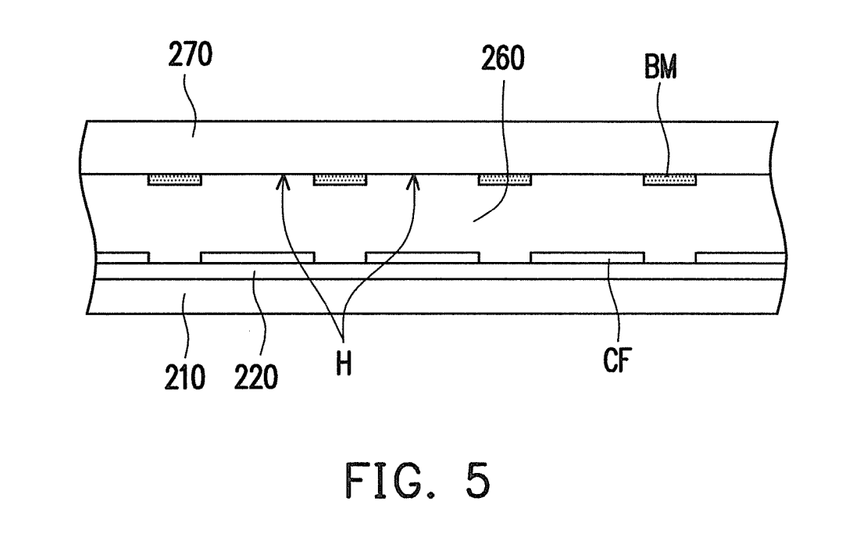
FIGS. 5 and 6 are schematic cross-sectional views respectively illustrating a display area according to the present invention.
Figure 6:
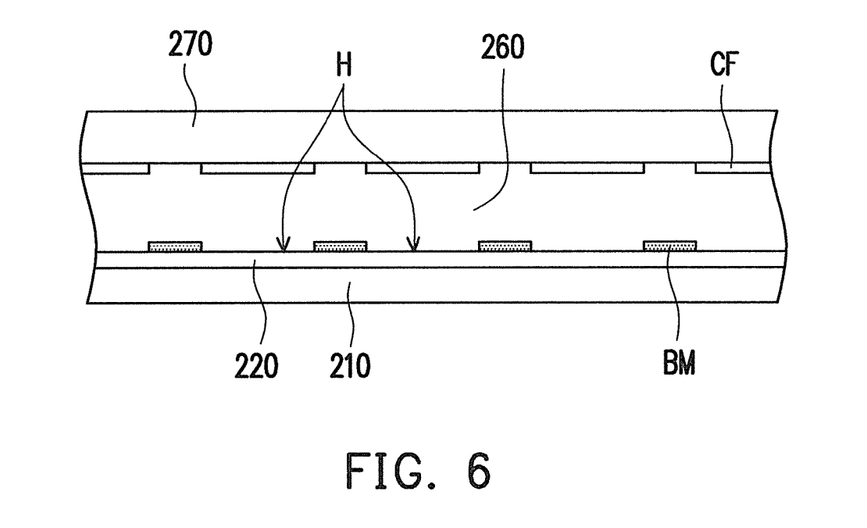

FIGS. 5 and 6 are schematic cross-sectional views respectively illustrating a display area according to the present invention. According to the present embodiment, the black matrix layer BM can also be disposed on the second substrate 270 as shown in FIG. 5. Here, the black matrix layer BM has a plurality of openings H, and each of the openings H is located above one of the color filter layers CF. Besides, in the present embodiment, positions of the color filter layers CF and positions of the black matrix layer BM can also be exchanged as indicated in FIG. 6. To be more specific, the black matrix layer BM having the openings H is disposed on the pixel array 220. The color filter layers CF are disposed on the second substrate 270, and each of the color filter layers CF is respectively positioned above one of the openings H.

Practically, the second protection layer 250 can be simultaneously formed during the formation of the color filter layers CF, the black matrix layer BM, and the photo spacer material (not shown). The protection layer 250 may be one of said three material layers or a combination thereof. Moreover, the protection layer 250 can have a single-layer structure or a multi-layer structure. People having ordinary skill in the art are able to modify said design based on actual needs.

Second Embodiment

Figure 7:
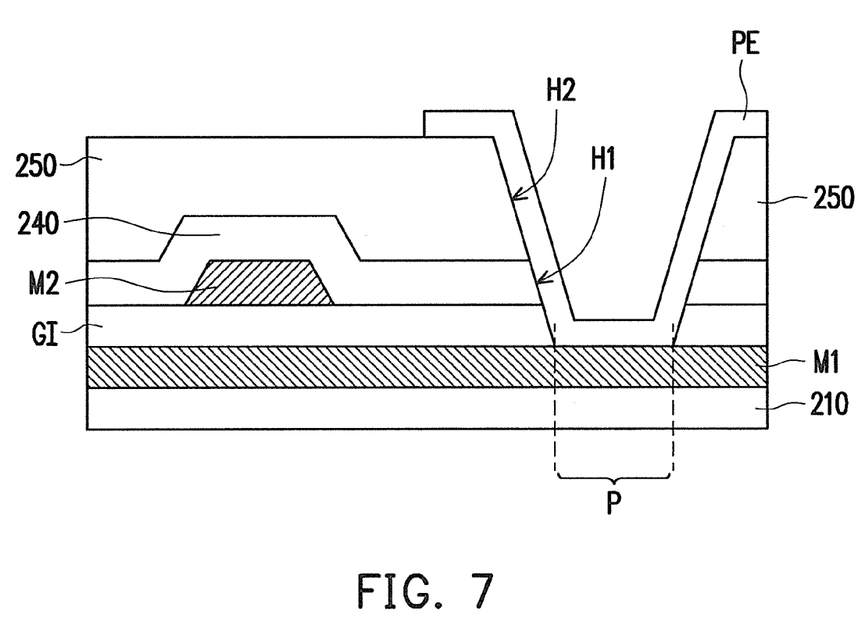
FIG. 7 is a schematic cross-sectional view of a peripheral circuit according to a second embodiment of the present invention.

FIG. 7 is a schematic cross-sectional view of a peripheral circuit according to a second embodiment of the present invention. Referring to FIGS. 2A and 7, the present embodiment is similar to the first embodiment, while the main difference therebetween lies in that the second protection layer 250 entirely covers the first protection layer 240 that is not covered by the second substrate 270. Besides, the second protection layer 250 has a plurality of second openings H2 located above the first openings H1 to expose the pads P. The first substrate 210, the pixel array 220, the peripheral circuit 230, the first protection layer 240, and the second protection layer 250 together form an array substrate of the present embodiment.

In the present embodiment, the second protection layer 250 entirely covers the peripheral area 214 of the display panel 200, and therefore the peripheral circuit 230 in the peripheral area 214 is completely covered by the second protection layer 250. The metal wirings M1 and M2 can be protect by the second protection layer 250. The peripheral circuit 230 on the entire peripheral area 214 can be well protected by the second protection layer 250.

To sum up, the display panel of the present invention has at least the following advantages.

By forming the second protection layer on the peripheral area of the display panel, the peripheral circuit of the display panel can be protected to a better extent. In particular, the second protection layer located above the intersections of different metal wirings serves to provide favorable protection. Thereby, the display panel having said second protection layer is able to effectively reduce abnormal signals caused by scratchings during fabrication and testing, and the yield rate of the display panel can be improved as well. In addition, the second protection layer having different structures can be disposed without performing additional steps when the display area is formed by implementing different processes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel, comprising:
a first substrate having a display area and a peripheral area;
a pixel array disposed in the display area;
a peripheral circuit disposed on the first substrate in the peripheral area and electrically connected to the pixel array;
a first protection layer disposed on the display area and the peripheral area to cover the pixel array and the peripheral circuit;
a second protection layer disposed on the first protection layer within the peripheral area, wherein the second protection layer includes a photo spacer material layer and at least one of a color filter material and a black matrix material directly stacked on each other;
a display medium; and
a second substrate disposed above the first substrate to expose the peripheral area and the peripheral circuit on the first substrate in the peripheral area, wherein the display medium is interposed between the first substrate and the second substrate and between the first protection layer and the second substrate.

2. The display panel as claimed in claim 1, wherein the peripheral circuit has a plurality of pads, and the first protection layer has a plurality of first openings exposing the plurality of pads.

3. The display panel as claimed in claim 2, wherein the second protection layer covers a portion of the first protection layer which is not shielded by the second substrate, and the second protection layer does not cover the plurality of first openings.

4. The display panel as claimed in claim 3, wherein the peripheral circuit has a plurality of outer lead bonding (OLB) areas and a plurality of wire on array (WOA) areas.

5. The display panel as claimed in claim 4, wherein the second protection layer covers the plurality of OLB areas and the plurality of WOA areas, and the second protection layer is formed.

6. The display panel as claimed in claim 4, wherein the second protection layer exclusively covers the plurality of OLB areas.

7. The display panel as claimed in claim 4, wherein the second protection layer exclusively covers the plurality of WOA areas.

8. The display panel as claimed in claim 1, wherein the display medium comprises liquid crystal, an organic electroluminescent material, or an electrowetting display medium.

9. The display panel as claimed in claim 1, further comprising:
- a black matrix layer disposed on the pixel array and made of the black matrix material, wherein the black matrix layer has a plurality of openings; and
- a plurality of color filter layers disposed on the pixel array, made of the color filter material, and located in the plurality of openings.

10. The display panel as claimed in claim 1, further comprising a color filter layer disposed on the pixel array and made of the colos filter material.

11. The display panel as claimed in claim 1, wherein the peripheral circuit comprises a first metal wiring and a second metal wiring, the first metal wiring and a second metal wiring are partially overlapped to form an intersection, and wherein the first protection layer, the second protection layer and the intersection are overlapped.

* * * * *